United States Patent [19]

Harten

[11] 4,197,072
[45] Apr. 8, 1980

[54] WAX EXTRUSION PEN FOR LOST WAX PATTERNS

[76] Inventor: Marvin A. Harten, 9578 Olympic Blvd., Beverly Hills, Calif. 90212

[21] Appl. No.: 868,308

[22] Filed: Jan. 10, 1978

[51] Int. Cl.² .............................................. B29F 3/08
[52] U.S. Cl. ................................... 425/144; 425/145; 425/192 R; 425/378 R
[58] Field of Search ................... 72/253 R, 272, 273; 264/220, 176 R; 425/143, 144, 145, 87, 458, 190, 192 R, 376 R, 378 R, 379 R, 191, 113

[56] References Cited

U.S. PATENT DOCUMENTS

| | | | |
|---|---|---|---|
| 1,342,450 | 6/1920 | Kost et al. | 425/458 X |
| 2,814,070 | 11/1957 | Bulkley et al. | 425/144 |
| 3,551,640 | 12/1970 | Duke, Jr. | 425/113 X |
| 4,088,430 | 5/1978 | Giles | 425/145 X |

*Primary Examiner*—Mark Rosenbaum
*Attorney, Agent, or Firm*—Allan M. Shapiro

[57] ABSTRACT

Wax pen extrudes wax at a controlled temperature from a nozzle for building a wax pattern such as is employed in the lost wax casting process. The wax pen carries its wax in a cylinder from which the wax is forced through a delivery barrel and out of the nozzle. Wax temperature is sensed in the delivery barrel to control the heating of the wax in the barrel and in the cylinder. The wax may be expelled by a spring-driven or a motor-driven piston.

4 Claims, 4 Drawing Figures

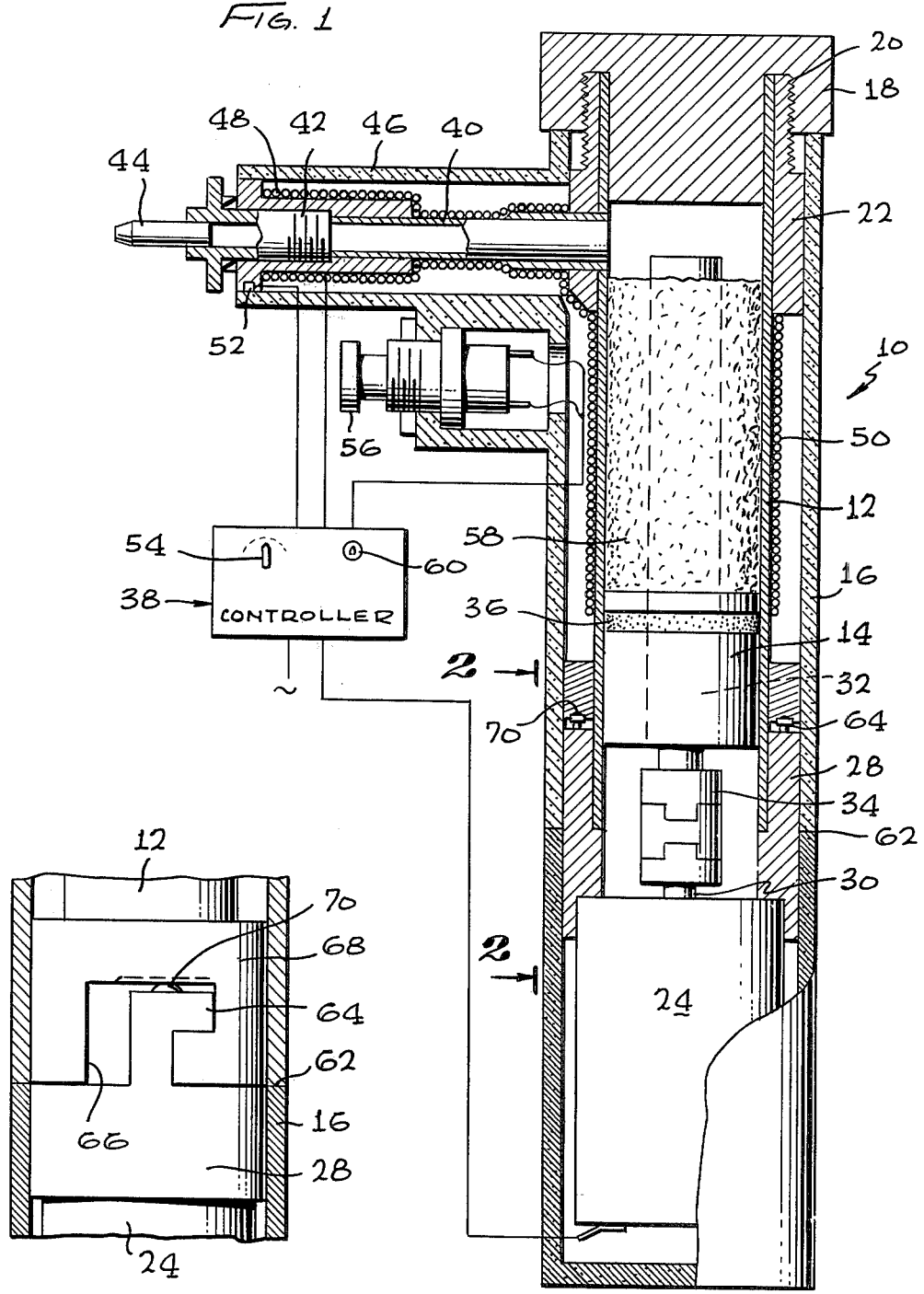

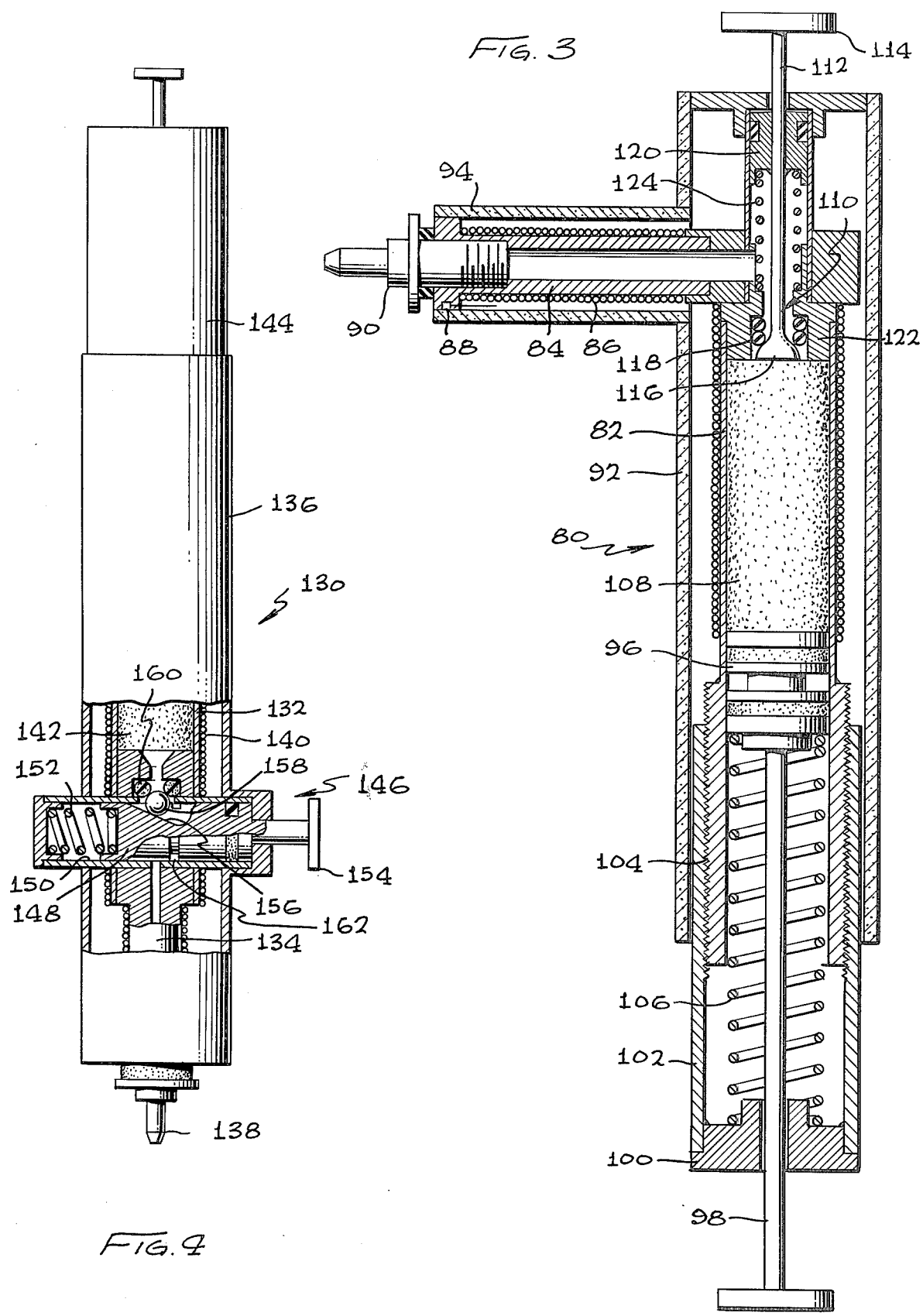

WAX EXTRUSION PEN FOR LOST WAX PATTERNS

BACKGROUND OF THE INVENTION

1. Field of the Invention

This invention is directed to a wax pen especially designed for the placement of accurate wax sections for the building of original wax patterns for use in the lost wax casting process and for other similar uses.

2. The Prior Art

The wax pen of this invention is used in conjunction with the lost wax casting process and other similar uses. The lost wax casting process was believed to be known to the ancient Egyptians. It has been used throughout the centuries for making intricate gold and silver jewelry. In the present day, it has wide application in the dental field where it is used extensively for making gold growns or caps. It is still widely used in the jewelry field and has recently found some application in industry for the creation of prototypes of intricate metal parts which have functional uses.

The lost wax casting process begins with a wax pattern which is of the size and shape of the device to be cast. The original wax pattern is sometimes machined from a solid block of wax, or the wax is carved with the use of heated tools. In another method of making the original wax pattern, wax rods or wax wires are employed. These are heated and bent to shape and attached to build up the wax pattern into the desired configuration.

Another method of building up the original wax pattern is to employ a wax depositor. There are several such wax depositors currently on the market. They each have a chamber into which a slug of wax is placed. The chamber is electrically heated so that the wax is melted. For a common type of wax used in this manner, the melting point is about 150 degrees F. The wax chamber has a spout from which the molten wax is applied drop-by-drop onto the original wax pattern. Delivery is by capillary action or gravity, and some of the depositors have a flow controller. As each drop is deposited from the spout onto the original wax pattern, it is allowed to harden, and then the succeeding drop is placed on top so as to create a wax buildup in the approximate and rough shape of the final pattern. This rough shape is then carved with heated tools, such as dental tools, to a final shape to produce the original wax pattern. The wax depositors which are currently available have a heater on the wax chamber which is controlled by a voltage control device such as a rheostat or a solid-state device. In such a depositor, the wax temperature is stabilized, and the degree of fluidity of the wax is stabilized only after a long period of time. The long period of time required for temperature stabilization and the deposition of liquid wax drop-by-drop from the depositor spout makes such depositors difficult to use because they lay on wax from which the final shape must be carved and do not lay on wax in the desired configuration.

After the original wax pattern is created in the shape of the desired casting, wax sprues are attached to it. The entire wax structure is then placed in a steel cylinder. Thereupon, the cylinder is filled with a fluid mixture of plaster of Paris with water or similar material which is referred to as the "investment." After the investment has hardened, the steel cylinder is placed in a furnace and brought to a temperature of approximately 1,250 degrees F. At this temperature, the wax is completely melted and burned out without residue. The cylinder is thereupon removed from the furnace, and molten metal (such as gold, silver, and the like) is poured into the investment through the sprue holes. The casting is preferably done by centrifugal casting, vacuum casting, or pressure casting techniques to make sure that the mold cavity defined by the original wax pattern and formerly occupied thereby is completely filled. When the casting metal has cooled, the investment is removed, and the metal casting remains. The sprues are cut off, and the metal casting is then finished and polished.

It is thus seen that the ease and accuracy with which the original wax pattern is created contributes to the convenience of production and the capability of conveniently achieving detail in the original wax pattern.

SUMMARY OF THE INVENTION

In order to aid in the understanding of this invention, it can be stated in essentially summary form that it is directed to a wax pen which has a cylinder therein for the receipt and heating of wax and from which wax of selected fluidity can be extruded. A temperature sensor detects the wax temperature and controls the heater to control the fluidity of the extruded wax.

It is thus an object of this invention to provide a wax pen which extrudes wax at a selectable temperature and selectable fluidity for aiding in producing the original wax pattern for use in the lost wax casting process and in order similar uses. It is another object to provide a wax pen wherein a slug of wax is heated and pressurized with the pressurization either by means of a spring or a motor to cause extrusion of the wax out of a nozzle, with the wax temperature being detected at the nozzle for fluidity control. It is another object to control the delivery of the fluid wax by means of a valve when the wax slug is spring-pressurized. It is a further object to control the delivery of the fluid wax by means of electric motor control when an electric motor is used to pressurize the wax cylinder. It is a further object to provide a wax pen wherein extrusion tips having different sizes and shapes of extrusion orifice openings can be interchanged so that, together with control of the wax fluidity, the wax pen can deposit wax shapes onto the original wax pattern to produce a wax pattern which requires a minimum of carving and finishing.

The features of the present invention which are believed to be novel are set forth with particularity in the appended claims. The present invention, both as to its organization and manner of operation, together with further objects and advantages thereof, may be best understood by reference to the following description taken in conjunction with the accompanying drawings.

BRIEF DESCRIPTION OF THE DRAWINGS

FIG. 1 is a side-elevational view of the first preferred embodiment of the wax pen of this invention, with parts broken away and parts taken in section generally along the longitudinal center line thereof.

FIG. 2 is a partial view, with parts broken away, showing details as seen along the line 2—2 of FIG. 1.

FIG. 3 is a longitudinal section generally along the center line of a second preferred embodiment of the wax pen of this invention.

FIG. 4 is a side-elevational view, with parts broken away and seen in section, generally along the longitudinal axis thereof.

DESCRIPTION OF THE PREFERRED EMBODIMENTS

The first preferred embodiment of the wax pen of this invention is generally indicated at 10 in FIG. 1. Wax pen 10 has a cylinder 12 of hollow, tubular configuration in which is mounted a piston 14 for slidable longitudinal movement therethrough. Housing 16 surrounds cylinder 12 and provides a structure which can be held in the hand. Cylinder 12 is preferably made of metal, such as steel or brass, while housing 16 is preferably made of polymer composition material. Cap 18 encloses the top of cylinder 12 and engages upon the top of housing 16. Cap 18 is threaded on screwthreads 20, which are formed on bushing 22, which is secured to the top of cylinder 12. The removability and replaceability of cap 18 permits the cylinder to be filled.

Motor 24 is mounted on sleeve 28, which is mounted on the bottom of cylinder 12. Motor 24 has an output shaft 30 which is connected to screw 32 through flexible coupling 34. Screw 32 has external screwthreads which engage in corresponding threads interiorly of piston 14. When motor 24 is energized to rotate its shaft 30, then the screw 32 drives piston 14 up in cylinder 12 to displace the contents thereof. Piston seal 36 permits the piston to move the material in the cylinder upward. Motor 24 is connected to controller 38 so that the motor is energized in accordance with requirements as hereinafter described.

Delivery barrel 40 is tubular and is connected to the side of cylinder 12 to receive material expressed from the cylinder. Securement is accomplished by means of attaching delivery barrel 40 through bushing 22. The outer end of delivery barrel 40 carries bushing 42 in which nozzle 44 is screwed. A series of different nozzles 44 can be selectively interchanged by choosing one and screwing it into bushing 42. In this way, different nozzle openings can be selected. The nozzle openings may be circular and of different diameters, but the nozzle openings may also have selected non-circular configuration. Cover 46 is positioned around delivery tube 40 and bushing 42 to enclose them. Heater coil 48 is wrapped around delivery barrel 40 and bushing 42. The same heater coil or an additional, similar heater coil 50 is wrapped around cylinder 12. Both heater coils 48 and 50 are connected to controller 38 to be controlled thereby.

Temperature sensor 52 is mounted in bushing 42 to sense the temperature of material delivered from nozzle 44. Temperature sensor 52 is preferably an electronic temperature sensor, such as a thermistor, and is also connected to controller 38. Controller 38 preferably has a temperature preselecting adjustment, such as potentiometer 54, which is connected into the system. By means of temperature selector 54 and sensor 52, the heater is controlled to produce the desired temperature. Housing 16 and cover 46 both protect the operator against the heated components of the wax pen, but also serve as insulation to aid in stabilization of the temperature of the various components.

Switch 56 is mounted on housing 16 below cover 46 and is manually accessible to be actuated by the forefinger. Switch 56 may be a simple off/on switch, or it may be a multiple position switch selecting additional contacts as it is depressed, or may be a continuously variable device such as a variable resistor. Switch 56 is connected to controller 38. As previously discussed, motor 24 is powered from controller 38 and, in fact, controller 38 includes circuitry by which the motor energization is controlled from switch 56. With a single off/on switch, motor 24 is directly controlled. With a multiple position switch 56 or a continually variable switch 56, controller 38 interprets the switch position to control the speed of motor 24. A greater manual depression of switch 56 causes faster motor operation.

With piston 14 in its lower position, cap 18 is removed, and wax slug 58 is plugged in cylinder 12. Cap 18 is replaced, and controller 38 is turned on to a selected wax temperature. The temperature is detected by sensor 52 so that, when the proper temperature is reached, the heater is modulated to maintain the proper temperature. Operation of switch 56 energizes motor 24 which rotates screw 32 forcing piston 14 upwardly. This forces the wax in slug 58 to be extruded through delivery barrel 40 and nozzle 44. This system allows the user to extrude the wax at any degree of fluidity from fully molten to almost fully solid by means of the temperature selected by selector potentiometer 54. Furthermore, the size and shape of the extruded wax coming from nozzle 44 is determined by the selection of one of the interchangeable tips. Lamp 60 can be connected to the temperature control portion to indicate when the selected temperature is achieved.

In order to partially disassemble wax pen 10 for access to the motor and to the cylinder, housing 16 is divided at 62.

Sleeve 28 extends upward into the annular opening between cylinder 12 and housing 16 in order to radially locate the divided housing. Bayonet hook 64 (see FIG. 2) on sleeve 28 engages into bayonet recess 66 in sleeve 68. Sleeve 68 is secured to cylinder 12 and housing 16. Thus, by rotating the lower portion of housing 16 in the counter-clockwise direction, the bayonet engagement of FIG. 2 can be released, and the entire motor assembly, flexible coupling 34, screw 32 and piston 14 can be withdrawn from the lower end of cylinder 12 for maintenance and cleaning or for placing an entire new wax slug 58 on screw 32. Electrical connectors 70 are located in the disconnectable bayonet joint in order to supply power to the motor 24.

The second preferred embodiment of the wax pen of this invention is generally indicated at 80 in FIG. 3. Wax pen 80 has a cylinder 82 and a delivery barrel 84 similar to those components in wax pen 10. The cylinder and delivery barrel are wrapped with electric heater coil 86, which is controlled by a controller similar to controller 38. Temperature sensor 88, preferably in the form of a thermistor, is positioned in the bushing in which nozzle 90 is interchangeably installed. Housing 92 and cover 94 respectively enclose the cylinder and the delivery barrel so that the wax pen may be held in the hand without contacting the heated parts.

Wax pen 80 employs a spring-driven piston to propel the heated wax for extrusion and employs a manually operable valve to control the extrusion flow. Piston 96 is slidably mounted in cylinder 82. It is carried on piston rod 98 which extends out of rear cap 100 of spring housing 102. Spring housing 102 is engaged in long threads 104 between the spring housing and the cylinder. Compression spring 106 is engaged between rear cap 100 and piston 96. With the spring housing removed, wax slug 108 is placed in the cylinder. Thereupon, spring housing 102 is screwed into place. The amount of spring compression and thus the amount of pressure in the wax slug is determined by the amount housing 102 is screwed on. If more pressure is desired, spring housing 102 is screwed farther up cylinder 82.

Outflow of fluid wax from cylinder 82 through delivery nozzle 84 and nozzle 90 is controlled by valve 110. Valve 110 has a valve stem 112 on which is mounted valve operator button 114. Valve disc 116 is enlarged and seats on O-ring valve seat seals 118. Spring collar 120 is mounted on valve stem 112, and compression spring 124 engages between collar 120 and a spring recess in cylinder head 122. Spring 124 thus urges valve disc 116 against its valve seat 118 to close the valve. Manual pressure on valve operator button 114 opens the valve to permit flow of fluid wax up from the cylinder through the open valve, through delivery barrel 88 and out nozzle 90. Thus, manual control controls the outflow of fluid wax from the nozzle. The degree of fluidity can be controlled by control of the wax temperature, and the size and shape of the extrusion can be chosen by selecting the desired nozzle 90.

The third preferred embodiment of the wax pen of this invention is shown in FIG. 4 and is generally indicated at 130. Wax pen 130 has a wax cylinder 132 and delivery barrel 134 in housing 136. Interchangeable nozzle 138 is mounted on the delivery barrel in the same manner as with wax pens 10 and 80. Heater coil 140 is wrapped around the cylinder and around the delivery barrel. The temperature is sensed by a sensor in the nozzle bushing, and this sensor controls the heater to control the wax fluidity, as previously described. The wax slug 142 in the cylinder is propelled by means of a spring housing 144, which is identical to spring housing 102 so that pressure is built up in the wax slug in accordance with the degree that the spring housing is screwed into place.

Outflow of fluid wax from the cylinder, through the delivery barrel, and out nozzle 138 is controlled by manually operable valve 146. Valve 146 comprises plunger 148 movably mounted in crossbore 150. Plunger 148 is spring-urged to the right by means of spring 152 and can be manually moved to the left by means of manually engageable valve operator button 154.

Angle slot 156 carries ball 158 which seats against O-ring valve seat 160. When plunger 148 is released, ball 158 is forced against its seat 160 to close the passage. However, when manual operation of button 154 moves plunger 148 to the left, passage is open so that fluid wax moves downward from the cylinder into the delivery barrel. Groove 162 permits the wax to flow around plunger 148.

Thus, each of the wax pens delivers wax of preselected fluidity with the control of the heat being managed by a sensor which senses wax temperature. With the pressure feeding of the fluid wax, a wide range of fluidity is available for delivery so that the user can extrude wax from a nozzle of any level of fluidity from molten to almost fully solid. In this way, original wax masters can be built up with the requisite accuracy which requires little post-carving and reworking.

There are a number of different types of control circuitry which can be employed in controlled 38 to control the heater as a result of sensed temperature. One of the preferred circuits employs potentiometer 54 as part of a bridge which incorporates the resistance of the thermistor temperature sensor through the use of an electronic network composed of in part an integrated circuit and a triac so that a resistance nullpoint is reached as a function of the potentiometer setting. At this point, the heating coil is deenergized or its input is substantially reduced. In this way, temperature control of the wax as a function of the sensed temperature is achieved.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A wax extrusion pen for manually extruding wax onto a wax master pattern, said wax extrusion pen comprising:

a cylinder for containing wax, a heater positioned around said cylinder, an insulated housing positioned around said heater, said insulated housing being of such size that it can be manually grasped and being sufficiently insulated so that manual grasp thereof is possible;

a nozzle connected to said cylinder so that wax can be expelled from said cylinder and extruded out of said nozzle, a heater around at least a portion of said nozzle so that wax is extruded at the desired temperature;

a piston in said cylinder and means interengaged between said piston and said cylinder for moving said piston in said cylinder to expel wax from said cylinder through said nozzle;

a manually operated plunger mounted on said cylinder, said manually operated plunger being connected to control discharge of wax from said cylinder through said nozzle, said manually operated plunger being movable in a direction toward said cylinder to allow wax discharge, said manually operated plunger being sized and positioned so that, when said wax extrusion pen housing is grasped in the hand, a finger of the same hand can depress said plunger to permit wax extrusion;

said piston drive means being positioned at one end of said cylinder and the other end of said cylinder carrying a removable cap for the introduction of wax into said cylinder, said means for moving said piston moving said piston toward said removable cap; and a temperature sensor thermally connected to sense temperature in wax delivered through said nozzle, said temperature sensor being connected to said heater to control wax temperature to a desired state of wax fluidity so that said piston can expel wax at a predetermined temperature through said nozzle.

2. The wax pen of claim 1 wherein said temperature sensor is interconnected with said heater and with a temperature selector so that a wax temperature can be preselected by said selector and said heater adds heat until the preselected wax temperature is reached.

3. The wax pen of claim 1 wherein a spring resiliently urges said wax flow control valve to a closed position.

4. The wax pen of claim 3 wherein a valve disc engages on a valve seat when said valve is closed and manual operation of said valve unseats said disc from said seat to permit flow of fluid wax through said nozzle carrying means.

* * * * *